US008953771B2

(12) United States Patent
Wing

(10) Patent No.: US 8,953,771 B2
(45) Date of Patent: Feb. 10, 2015

(54) METHOD AND APPARATUS TO PROVIDE CRYPTOGRAPHIC IDENTITY ASSERTION FOR THE PSTN

(75) Inventor: Daniel G. Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 2671 days.

(21) Appl. No.: 11/270,017

(22) Filed: Nov. 7, 2005

(65) Prior Publication Data

US 2007/0121583 A1    May 31, 2007

(51) Int. Cl.
| | |
|---|---|
| H04M 7/00 | (2006.01) |
| H04L 29/06 | (2006.01) |
| H04M 3/42 | (2006.01) |
| H04M 1/253 | (2006.01) |

(52) U.S. Cl.
CPC .......... *H04L 63/08* (2013.01); *H04L 29/06027* (2013.01); *H04L 63/18* (2013.01); *H04M 3/42042* (2013.01); *H04M 7/0024* (2013.01); *H04L 65/1006* (2013.01); *H04M 1/2535* (2013.01); *H04M 3/42059* (2013.01); *H04M 2242/22* (2013.01)
USPC ................. 379/221.01; 379/273; 370/355

(58) Field of Classification Search
USPC ............. 379/207.15, 142.08, 142.01–142.06, 379/142.14–142.17, 67.1, 142.07, 379/220.01–221.02, 221.14, 272, 273; 370/355, 356, 392, 393, 395.32
See application file for complete search history.

(56) References Cited

U.S. PATENT DOCUMENTS

| | | | |
|---|---|---|---|
| 4,903,260 | A | 2/1990 | Boettle et al. |
| 5,347,516 | A | 9/1994 | Yoshida |
| 5,392,357 | A | 2/1995 | Bulfer et al. |
| 5,991,292 | A | 11/1999 | Focsaneanu et al. |
| 6,137,869 | A | 10/2000 | Voit et al. |
| 6,377,570 | B1 | 4/2002 | Vaziri et al. |
| 6,381,238 | B1 | 4/2002 | Hluchyj |
| 6,426,948 | B1 | 7/2002 | Bowman-Amuah |
| 6,671,272 | B2 | 12/2003 | Vaziri et al. |
| 6,671,818 | B1 | 12/2003 | Mikurak |
| 6,721,397 | B1 | 4/2004 | Lu |

(Continued)

FOREIGN PATENT DOCUMENTS

| | | |
|---|---|---|
| CA | 2265776 | 4/1998 |
| EP | 0 732 835 | 9/1996 |

(Continued)

OTHER PUBLICATIONS

M. Baugher, D. McGrew, Cisco Systems, Inc., M. Naslund, E. Carrara, K. Norrman, Ericsson Research, http://www.ietf.org/rfc/rfc3711.txt, Mar. 2004, 53 pages.

(Continued)

*Primary Examiner* — Md S Elahee
(74) *Attorney, Agent, or Firm* — Lempia Summerfield Katz LLC

(57) ABSTRACT

The present application provides an authentication scheme that allows a device to provide additional authentication of a Publicly Switched Telephone Network (PSTN) identity assertion made in a PSTN call by also sending an Internet Protocol (IP) communication. The device sends the IP communication generally in parallel with the PSTN call. The IP communication includes a network identity assertion, which optionally may be authenticated using a cryptographically secure technique. The network identity assertion, being more difficult to falsify, provides additional authentication of the PSTN identity assertion.

9 Claims, 7 Drawing Sheets

(56) References Cited

U.S. PATENT DOCUMENTS

| | | | |
|---|---|---|---|
| 6,868,140 B2* | 3/2005 | Myers et al. | 379/67.1 |
| 7,110,391 B1 | 9/2006 | Rogers et al. | |
| 7,113,577 B2* | 9/2006 | Cook et al. | 379/142.01 |
| 7,308,101 B2 | 12/2007 | Wing | |
| 2001/0038628 A1 | 11/2001 | Ofek et al. | |
| 2002/0196781 A1 | 12/2002 | Salovuori | |
| 2003/0021415 A1 | 1/2003 | Torvinen | |
| 2003/0056092 A1 | 3/2003 | Edgett et al. | |
| 2003/0131353 A1 | 7/2003 | Blom et al. | |
| 2004/0019801 A1 | 1/2004 | Lindholm et al. | |
| 2004/0022237 A1 | 2/2004 | Elliott et al. | |
| 2004/0068481 A1 | 4/2004 | Seshadri et al. | |
| 2004/0205359 A1 | 10/2004 | Matsuhira | |
| 2005/0125357 A1 | 6/2005 | Saadat et al. | |
| 2005/0163316 A1 | 7/2005 | Wing | 380/257 |

FOREIGN PATENT DOCUMENTS

| | | |
|---|---|---|
| EP | 1 014 632 | 6/2000 |
| GB | 2283154 | 4/1995 |
| WO | WO 90/12466 | 10/1990 |
| WO | WO 95/25407 | 9/1995 |
| WO | WO 95/31060 | 11/1995 |
| WO | WO9823080 | 5/1998 |
| WO | WO0139028 | 5/2001 |
| WO | 03084111 | 10/2003 |
| WO | 2005039159 | 4/2005 |

OTHER PUBLICATIONS

P. Faltstrom, Cisco Systems, Inc., M. Mealling, Verisign, http://www.ietf.org/rfc/rfc3761.txt, Apr. 2004, 17 pages.

J. Peterson, NeuStar, C. Jennings, Cisco Systems, http://www.ietf.org/wg/sip/draft-ietf-sip-identity/draft-ietf-sip-identity-04.txt, Feb. 16, 2005, 33 pages.

European Patent Office, "European Search Report", May 6, 2009, 7 pages.

Falstrom et al., "The E.164 to Uniform Resource Identifiers (URI) Dynamic Delegation Discovery System (DDDS) Application (ENUM)", RFC 3761, Apr. 2004, 18 pgs.

Peterson et al "Enhancements for Authenticated Identity Management in the Session Initiation Protocol (SIP)", draft-ietf-sip-identity-04.txt, Feb. 16, 2005, 36 pgs.

Schneier, Bruce, Applied Cryptography, 2nd Edition, John Wiley & Sons Inc. 1996, pp. 47-51.

Stolowitz Ford Cowger LLP, Listing of Related Cases, Dec. 31, 2009.

Draft ITU-T Recommendation H.323 entitled "Visual Telephone Systems and Equipment for Local Area Networks which Provide a Non-Guaranteed Quality of Service", SG15 Plenary May 28, 1996.

Nakamura Y. et al.: "On a Hybrid Network System of Circuit Switching and Packet Switching", *The Transactions of the IECE of Japan*, vol. E 65, No. 6, Abstracts, 1982.

Low C. et al.: "WEBIN—an Architecture for Fast Deployment of In-Based Personal Services", Workshop Record, Intelligent Network, Freedom and Flexibility: Realising the Promise of Intelligent Network Services, p. 1-12, Apr. 21, 1996, XP002043670.

Babbage R. et al.: "Internet Phone—Changing the Telephony Paradigm?", BT Technical Journal, vol. 15, No. 2, Apr. 1997, p. 145-157, XP000676853.

Verified translation of EP 1014632 submitted to the United Kingdom Patent Office, Jul. 28, 2004.

* cited by examiner

METHOD AND APPARATUS TO PROVIDE CRYPTOGRAPHIC IDENTITY ASSERTION FOR THE PSTN

BACKGROUND OF THE INVENTION

This invention relates generally to providing security for the Publicly Switched Telephone Network (PSTN) and more particularly to using packet-switched communications to authenticate identity assertions made over the PSTN.

Caller Identification (Caller ID) and Automatic Number Identification (ANI) are two mechanisms to indicate the identity of a PSTN caller. In general Caller ID is not policed or controlled by any service providers, and as a result, callers can easily make false Caller ID identity assertions without being caught. For example, a caller with access to an Integrated Services Digital Network (ISDN) could set the Caller ID field on the D channel to any value to make a false identity assertion. The caller could then use a Terminal Adapter (TA) to transfer an ISDN communication with the false identity assertion to the PSTN. Since service providers in general do not police the Caller ID field, the caller is unlikely to get caught.

ANI is only slightly more secure than Caller ID. Even though ANI does include an ANI II field indicating whether the network or a subscriber inserted an identity, not all service providers police the ANI II field. Moreover, service providers in some countries allow users who have changed the ANI value to access the ANI II field and falsely indicate that the network inserted the identity.

The ease at which users can make false identity assertions over the PSTN using Caller ID or ANI values is problematic. For example, criminals can insert a false ANI value when calling a financial institution to get past initial security checks by appearing to be calling from a customer's home. Similarly, criminals, collection agencies, and private investigators could change the Caller ID value to impersonate another for generally malicious reasons. Neither the ANI nor the Caller ID are cryptographically secured, and rely completely on trusting the previous service provider or previous network element.

Because of the forgoing limitations, identity assertions over the PSTN are unreliable. The disclosure that follows solves this and other problems.

SUMMARY OF THE INVENTION

The present application provides an authentication scheme that allows a device to provide additional authentication of a Publicly Switched Telephone Network (PSTN) identity assertion made in a PSTN call by also sending an Internet Protocol (IP) communication. The device sends the IP communication generally in parallel with the PSTN call. The IP communication includes a network identity assertion, which optionally may be authenticated using a cryptographically secure technique. The network identity assertion, being more difficult to falsify, provides additional authentication of the PSTN identity assertion.

The foregoing and other objects, features and advantages of the invention will become more readily apparent from the following detailed description of a preferred example of the invention which proceeds with reference to the accompanying drawings.

DETAILED DESCRIPTION

Figure 1A:
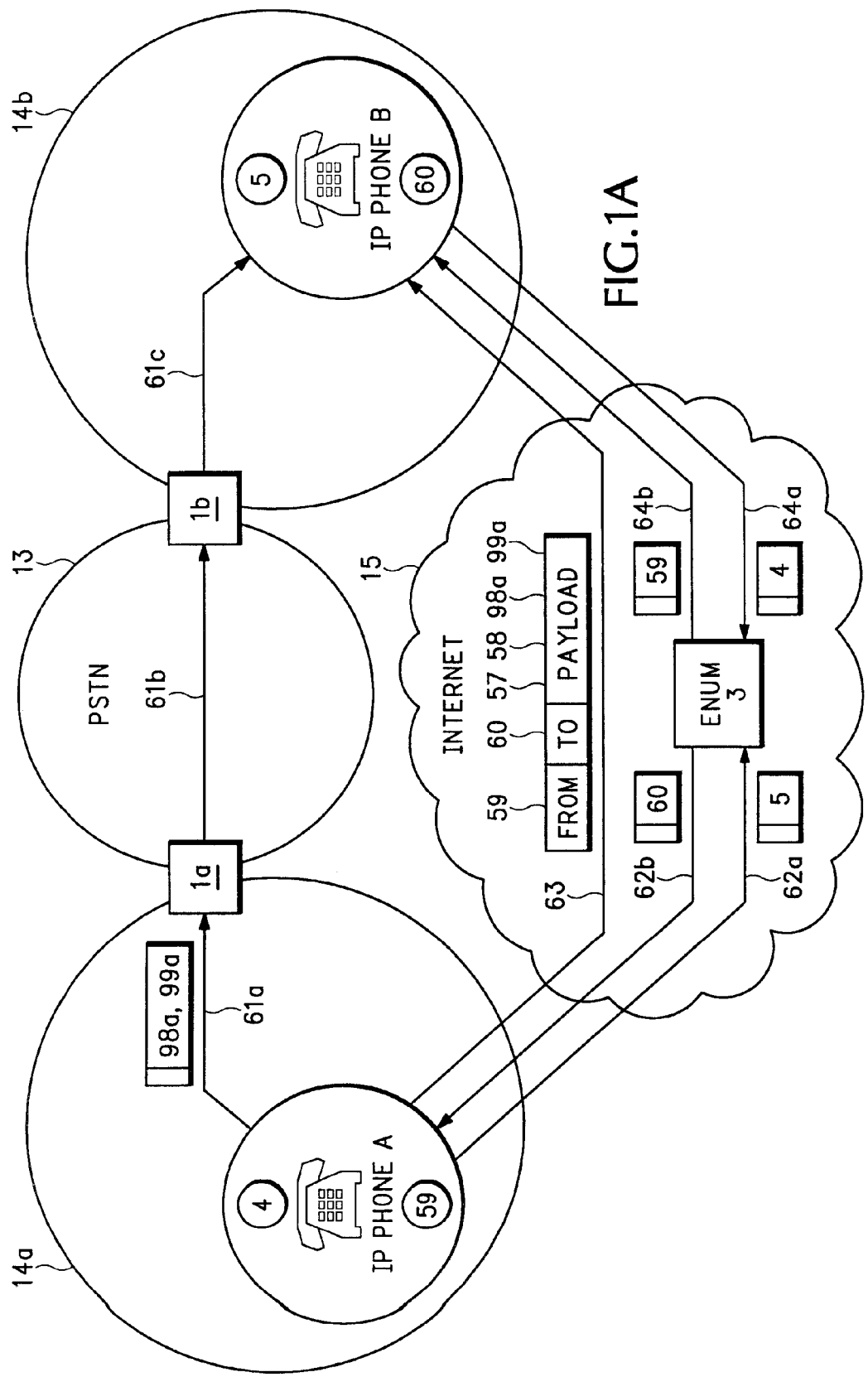
FIG. 1A is a diagram of an IP phone authenticating a PSTN identity assertion.

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

FIG. 1A shows one example of the present application that validates Caller ID and ANI identity assertions made over the PSTN. Other examples of the present application provide validation of other forms of identity assertions made over the PSTN.

In the example shown in FIG. 1, IP phone A is on private network 14a while IP phone B is on private network 14b. In this example, IP phones A and B are unable to exchange Voice over Internet Protocol (VoIP) communications. In some examples, this may be due to insufficient IP network bandwidth available. In other examples, network 14A or network 14B do not permit incoming VoIP traffic but do permit the IP identity assertion described in this disclosure. As a result, IP phone A calls IP phone B over the PSTN.

To make the PSTN call, IP phone A first sends communication 61a including a Caller ID assertion 98a and an ANI assertion 99a to IP phone B at phone number 5. Communication 61a is converted to PSTN signal 61b at gateway 1a. PSTN signal 61b is converted to communication 61c at gateway 1b before being received at IP phone B.

Generally in parallel with communication 61a, IP phone A determines the IP contact information 60 for IP phone B. In the present example, IP phone A makes an Electronic Numbering (ENUM) query 62a with ENUM database 3 to determine the IP contact information 60. The ENUM query is described in "rfc3761.txt" which is herein incorporated by reference. The document "rfc3761.txt" is publicly available and can be found on the Internet from the Internet Engineering Task Force (IETF). ENUM query 62a includes the phone number 5 for IP phone B. The ENUM database 3 uses phone number 5 to lookup IP contact information 60 for IP phone B. In this example the IP contact information 60 is a Session Information Protocol (SIP) identity 60 for IP phone B, however, any IP identity may be used. The ENUM database 3 sends back communication 62b including SIP identity 60.

IP phone A sends a communication 63 to IP phone B. In the present example, the communication 63 is a SIP signaling message 63. Message 63 may pass directly between IP phone A and IP phone B, as shown in the figure, or message 63 may pass through various call routing devices between phone A and phone B. Although bandwidth was not available for a VoIP call between IP phones A and B, SIP signaling message 63 is small and thus bandwidth is available. The "From" address field includes a SIP identity 59 for IP phone A, the "To" address field includes SIP identity 60 and a payload 57 includes an indication 58 that PSTN call 61a was made. Optionally payload 57 also includes Caller ID assertion 98a and ANI assertion 99a.

Any one of several cryptographically secure authentication techniques may be used to ensure that IP phone A does not make a false identity assertion in the "From" address field. In one example, the "From" address field is cryptographically authenticated by using the method described in "draft-ietf-sip-identity-04.txt" which is herein incorporated by reference. The document "draft-ietf-sip-identity-04.txt" is publicly available and can be found on the Internet from the Internet Engineering Task Force (IETF).

IP phone B receives and correlates PSTN call 61c and SIP signaling message 63. In one example IP phone B uses the indication 58 to correlate PSTN call 61c with SIP signaling message 63. In a second example IP phone B correlates PSTN call 61c with SIP signaling message 63 because both include the same ANI assertion 99a.

After correlating, IP phone B validates the Caller ID assertion 98a and the ANI assertion 99a. In one example, IP phone B uses the Caller ID assertion 98a or the ANI assertion 99a included in the PSTN call 61c to determine the alleged phone number 4 for IP phone A. IP phone B then provides the alleged phone number 4 to the ENUM database 3 using ENUM query 64a. The ENUM database 3 uses alleged phone number 4 to lookup the SIP identity 59 associated with the alleged phone number 4. Communication 64b is sent back and includes the SIP identity 59 associated with alleged phone number 4. Since it is generally much more difficult to falsify a SIP identity than it is to falsify a PSTN identity assertion, the ENUM query 64a authenticates the PSTN identity assertion regardless of whether cryptographically secure authentication techniques are used with the SIP identity 59.

After receiving communication 64b, IP phone B compares the SIP identity 59 received from ENUM database 3 with the SIP identity 59 included in the "From" header for SIP signaling message 63. If the values do not match, IP phone B regards the SIP identity 59 received in SIP signaling message 63 as the actual identity of the caller. Phone B may alert a user if a mismatch occurs, as a mismatch indicates an attempt was made by Phone A to provide a fraudulent identity. Alerting may include terminating the PSTN call 61c, displaying a message, illuminating a light or any other method of alerting the user. If the values do match, then the alleged phone number 4 has been authenticated. Optionally for additional authentication, IP phone B may also compare values of Caller ID assertion 98a and ANI assertion 99a included in PSTN call 61c and SIP signaling message 63. Optionally for additional authentication, IP phone B may perform cryptographic authentication following procedures described in draft-ietf-sip-identity.txt.

Figure 1B:
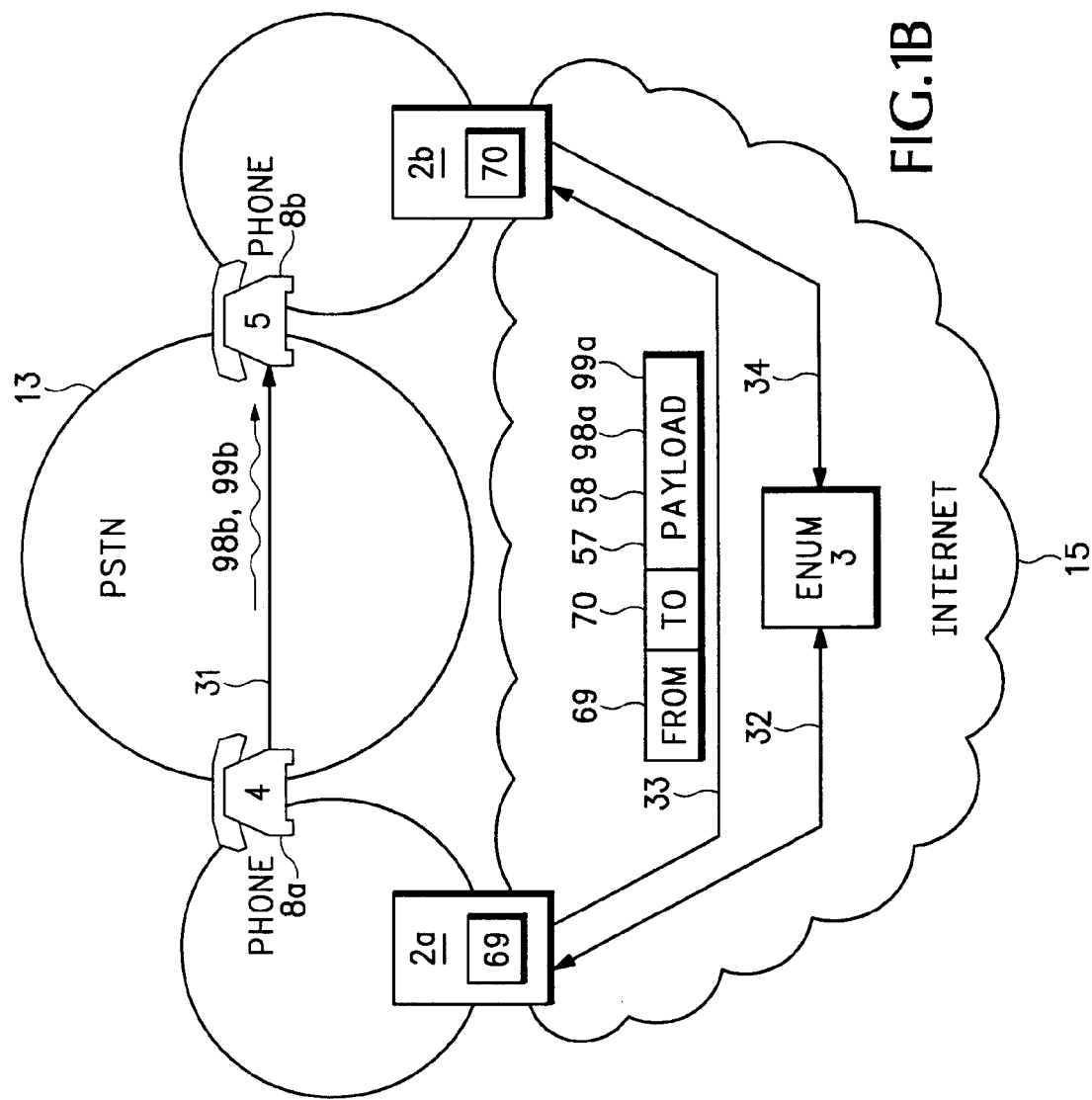
FIG. 1B is a diagram a computer authenticating a PSTN identity assertion.

Referring now to FIG. 1B, an additional example is shown. In this example the phones are Plain Old Telephone System (POTS) phones. Phone 8a is associated with computer 2a in ENUM database 3. Similarly, phone 8b is associated with computer 2b in ENUM database 3.

Phone 8a is initiates a PSTN call 31 with phone 8b. PSTN call 31 includes Caller ID assertion 98b and ANI assertion 99b that allegedly identify the phone number 4 for phone 8a.

Generally in parallel with PSTN call 31, computer 2a exchanges communications 32 with ENUM database 3 to learn a SIP identity 70 associated with phone number 5. Next computer 2a sends SIP signaling message 33 to authenticate PSTN call 13. The "From" address field of SIP signaling message 63 includes a SIP identity 69 for computer 2a, the "To" address field includes SIP identity 70 and a payload 57 includes an indication 58 that PSTN call 31 was made. Optionally payload 57 also includes both Caller ID assertion 98a and ANI assertion 99a.

Computer 2b receives and correlates PSTN call 31 and SIP signaling message 33. In one example computer 2b uses the ANI assertion 99a to correlate the PSTN call 31 with the SIP signaling message 33.

After correlating, the Caller ID assertion 98b and the ANI assertion 99b are validated. In one example, computer 2b uses the Caller ID assertion 98b or the ANI assertion 99b to determine an alleged phone number 4 for phone 8a. Computer 2b exchanges communications 34 with ENUM database 3 to determine the SIP identity 69 associated with alleged phone number 4.

Next computer 2b compares the SIP identity 69 associated with the alleged phone number 4 with the SIP identity 69 included in SIP signaling message 33. If the values do not match, computer 2b regards the SIP identity 69 included in SIP signaling message 33 as the actual identity of PSTN call 31. Computer 2b may alert a user if a mismatch occurs, as a mismatch indicates an attempt was made by Phone A to provide a fraudulent identity. Alerting may include terminating the PSTN call 31, displaying a message, illuminating a light or any other method of alerting the user. If the values do match, then the alleged phone number 4 has been authenticated. Optionally for additional authentication, computer 2a may also compare the Caller ID assertion 98b and the ANI assertion 99b provided in PSTN call 31 with the values provided in the SIP signaling message 33. Optionally for additional authentication, IP phone B may perform cryptographic authentication following procedures described in draft-ietf-sip-identity.txt.

Figure 2:
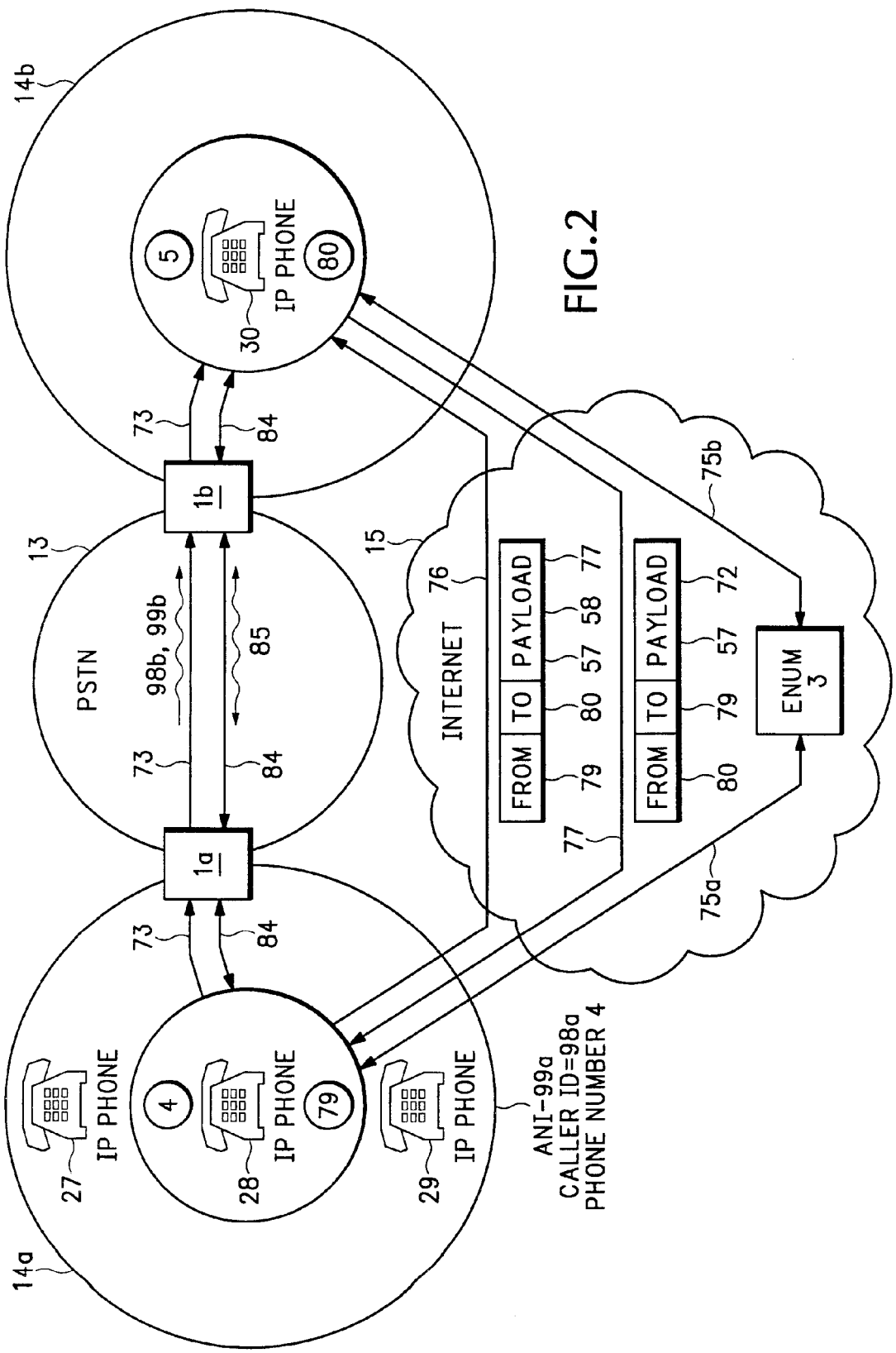
FIG. 2 is a diagram of an IP phone using DTMF tones to further specify a PSTN identity assertion.

Referring now to FIG. 2, an additional example is shown. In this example, private network 14a includes multiple IP phones 27, 28 and 29. The private network 14a is a business that has only one phone number 4, Caller ID 98a and ANI 99a value associated with all three IP phones 27, 28 and 29. In this example Dual Tone Multi-Frequency (DTMF) is used to disambiguate which of the IP phones 27, 28 and 29 is calling IP phone 30.

IP phone 28 first sends PSTN call 73 including Caller ID assertion 98b and ANI assertion 99b to IP phone 30 at phone number 5. At generally the same time IP phone 28 exchanges communications 75a with ENUM database 3 to determine a SIP identity 80 for IP phone 30.

After determining SIP identity 80, IP phone 28 sends a SIP signaling message 76 to IP phone 30. This SIP message may be sent directly between IP phone 28 and IP phone 30, as shown in the figure, or the SIP message may be sent to SIP call routing devices that are between IP phone 28 and IP phone 30. The "From" address field of SIP signaling message 76 is SIP identity 79 for IP phone 28, the "To" address field is SIP identity 80 and the payload 57 includes an indication 58 that PSTN call 73 was made and an indication 77 that IP phone 28 is capable of sending DTMF tones 84.

After receiving PSTN call 73 and SIP signaling message 76, IP phone 30 correlates PSTN call 73 with SIP signaling message 76. In one example, IP phone 30 uses the indication 58 to associate PSTN call 73 with SIP signaling message 76.

Next IP phone 30 determines and validates the alleged phone number 4 in the manner previously described. Also, because indication 77 was provided, IP phone 30 determines whether additional identification is necessary to authenticate IP phone 28. When additional identification is necessary, IP phone 30 sends SIP signaling message 77 to IP phone 28, which includes a request 72 play out of DTMF tones 85.

After receiving SIP signaling message 77, IP phone 28 responds to request 72 by sending the requested DTMF tones 85 over the PSTN connection 73. IP phone 30 receives the DTMF tones 85 and determines that PSTN call 73 originated from IP phone 28.

Figure 3:
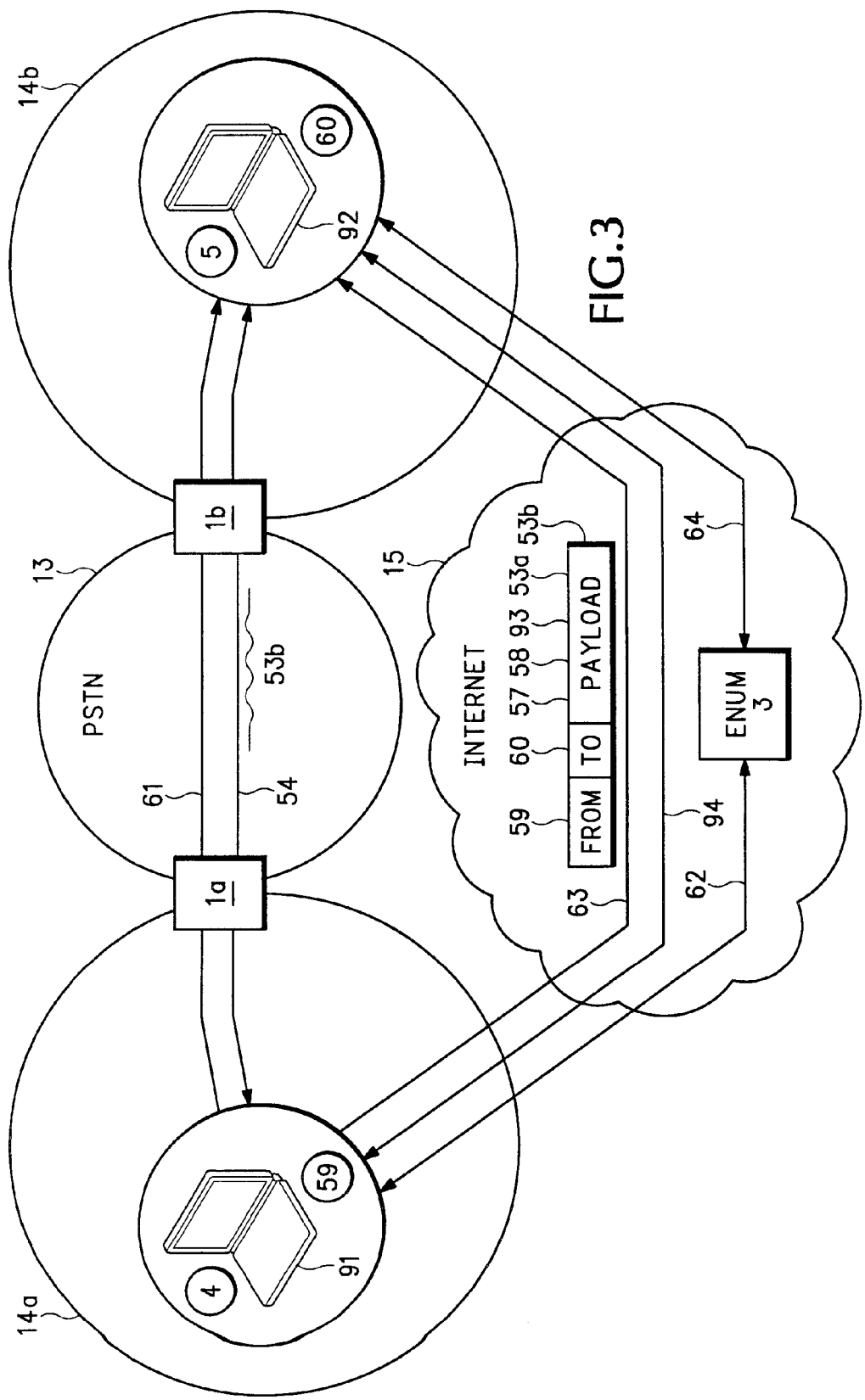
FIG. 3 is a diagram of a computer leveraging an authentication communication to initiate additional media communications.

Referring now to FIG. 3, an additional example is shown. In this example the SIP signaling message 63 is leveraged to establish additional media communications between computers 91 and 92. In some examples computers 91 and 92 may be IP phones.

Computer 91 first sends PSTN call 61 to computer 92 at phone number 5. At generally the same time computer 91 exchanges communications 62 with ENUM database 3 to determine a SIP identity 60 for computer 92.

After determining SIP identity 60, computer 91 sends a SIP signaling message 63 to computer 92. The "From" address field of SIP signaling message 63 is a SIP identity 59 for computer 91, the "To" address field 60 is SIP identity 60 and the payload 57 includes indication 58 that a PSTN call 61 was made. Additionally in this example, the payload 57 also includes an indication 93 that computer 91 is willing to initiate an additional media exchange and cryptographic parameters 53b plus an indication 53a that IP phone A is capable of using Secure Real-time Transport Protocol over the Publicly Switched Telephone Network (SRTP-over-PSTN). SRTP-over-PSTN is described in published patent application Ser. No. 10/763,471, which is herein incorporated by reference. SRTP-over-PSTN provides single stage encryption for messages traveling partially over the network and partially over the PSTN.

Next, computer 92 correlates the PSTN call 61 with SIP signaling message 63. In this example, computer 92 uses indication 58 to associate PSTN call 61 with SIP signaling message 63. Computer 92 also exchanges communications 64 with ENUM database 3 to determine the SIP identity 59 associated with alleged phone number 4.

Next, computer 92 validates the alleged phone number 4 by comparing the SIP identity 59 associated with the alleged phone number 4 with the SIP identity 60 included in SIP signaling message 63. Also, since indication 93 was provided, computer 92 determines whether additional media communications 94 are needed. The computer 92 may then establish media communications 94 with computer 91. Media communications 94 may include instant messaging, whiteboard, interactive video, or any other media.

Since SIP signaling message 63 also includes indication 53a, computer 92 determines whether PSTN communications 54 using SRTP-over-PSTN are needed. The computer 92 may then establish PSTN communications 54 using SRTP-over-PSTN with computer 91 using cryptographic parameters 53b. PSTN communications 54 includes media.

An advantage of establishing PSTN communications 54 using SRTP-over-PSTN in this manner is that computers 91 and 92 do not need to be preconfigured with a scared secret. The shared secret may be included in the cryptographic parameters 53b, which is shared between computers 91 and 92 via SIP signaling message 63. For even more security, other standardized methods (for example, Transport Layer Security (TLS) or Secure Multi-Purpose Internet Mail Extensions (S/MIME)) may be used to encrypt SIP signaling message 63 thereby ensuring that cryptographic parameters 53b remain secret.

Figure 4:
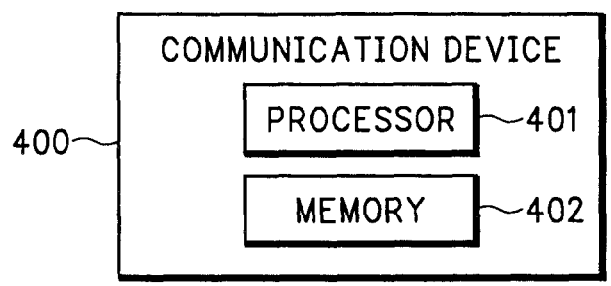
FIG. 4 is a detailed diagram of a device to authenticate PSTN identity assertions.

FIG. 4 shows a communication device 400 that uses a network communication to authenticate a PSTN identity assertion. The device 400 performs the functions of the IP phones and the computers shown in FIGS. 1-3. The device 400 includes a processor 401 and a memory 402. The memory 402 includes instructions that, when executed by the processor 401, perform the functions described in the flowcharts of FIGS. 5 and 6.

Figure 5:
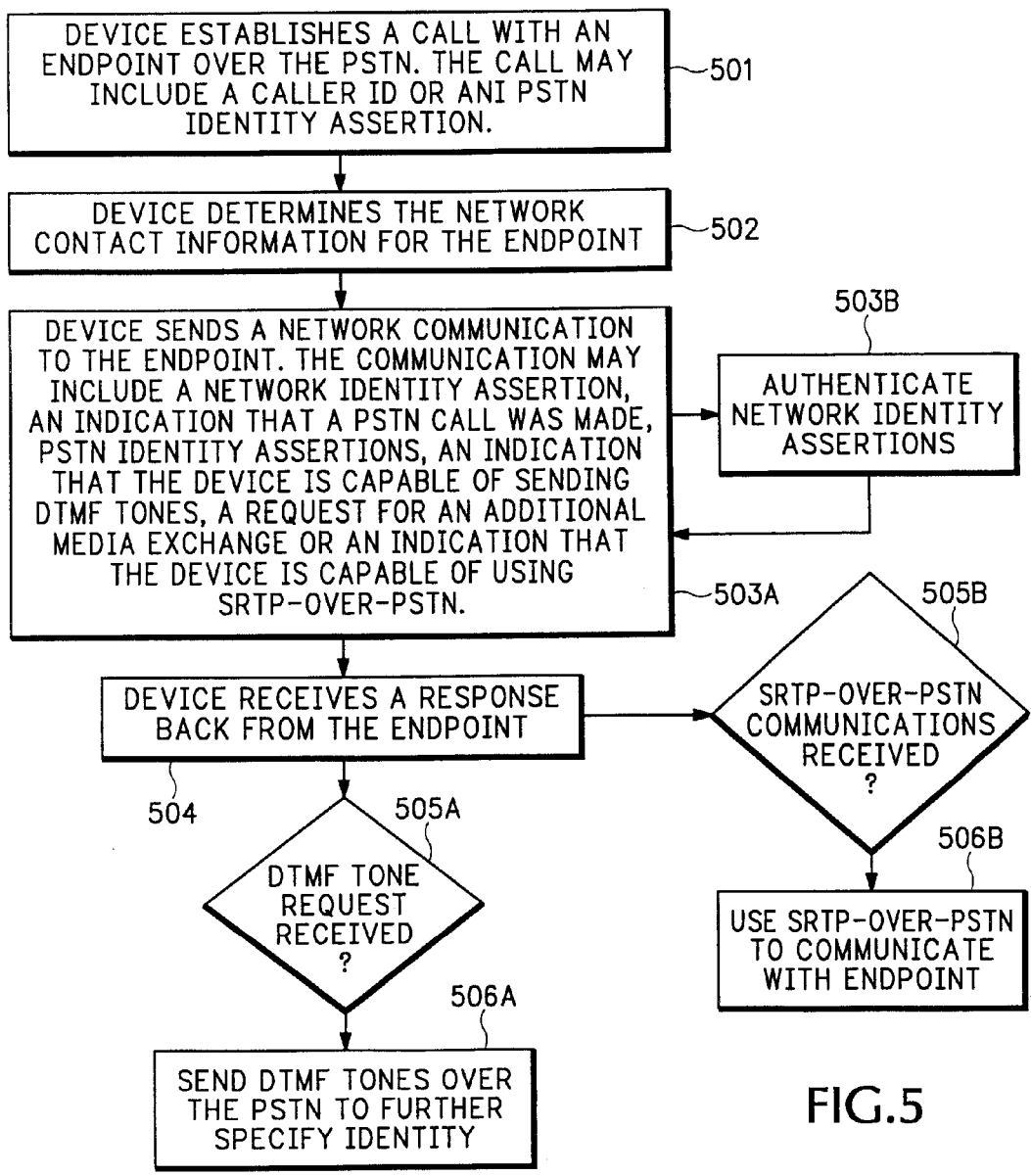
FIG. 5 is a flowchart showing how the device sends an authentication.

Referring to FIG. 5, the device 400 in block 501 uses the PSTN to establish a call with an endpoint. The device 400 determines the network contact information for the endpoint in block 502. In block 503A, the device 400 sends a network communication to the endpoint. The network communication includes a header that includes a network identity assertion. The network communication also includes a payload that may include an indication that a PSTN call was made, PSTN or network identity assertions, an indication of DTMF capability, an indication of SRTP-over-PSTN capability, or an indication of a willingness to exchange additional media communications. Optionally, in block 503B the device 400 may also authenticate the network identity assertions that are included in the header using a cryptographically secure authentication technique.

In block 504 the device 400 may receive a network communication back from the endpoint. In block 505A the device 400 determines whether the network communication includes a DTMF tone request. If DTMF tones are requested, device 400 sends DTMF tones over the PSTN in block 506A. In block 505B the device 400 determines whether SRTP-over-PSTN communications are needed. If SRTP-over-PSTN communications are needed, in block 506B device 400 uses SRTP-over-PSTN to communicate with the endpoint. In block 505C the device 400 determines whether additional media communications are needed. If additional media communications are needed, in block 506C device 400 exchanges media communications with the endpoint.

Figure 6:
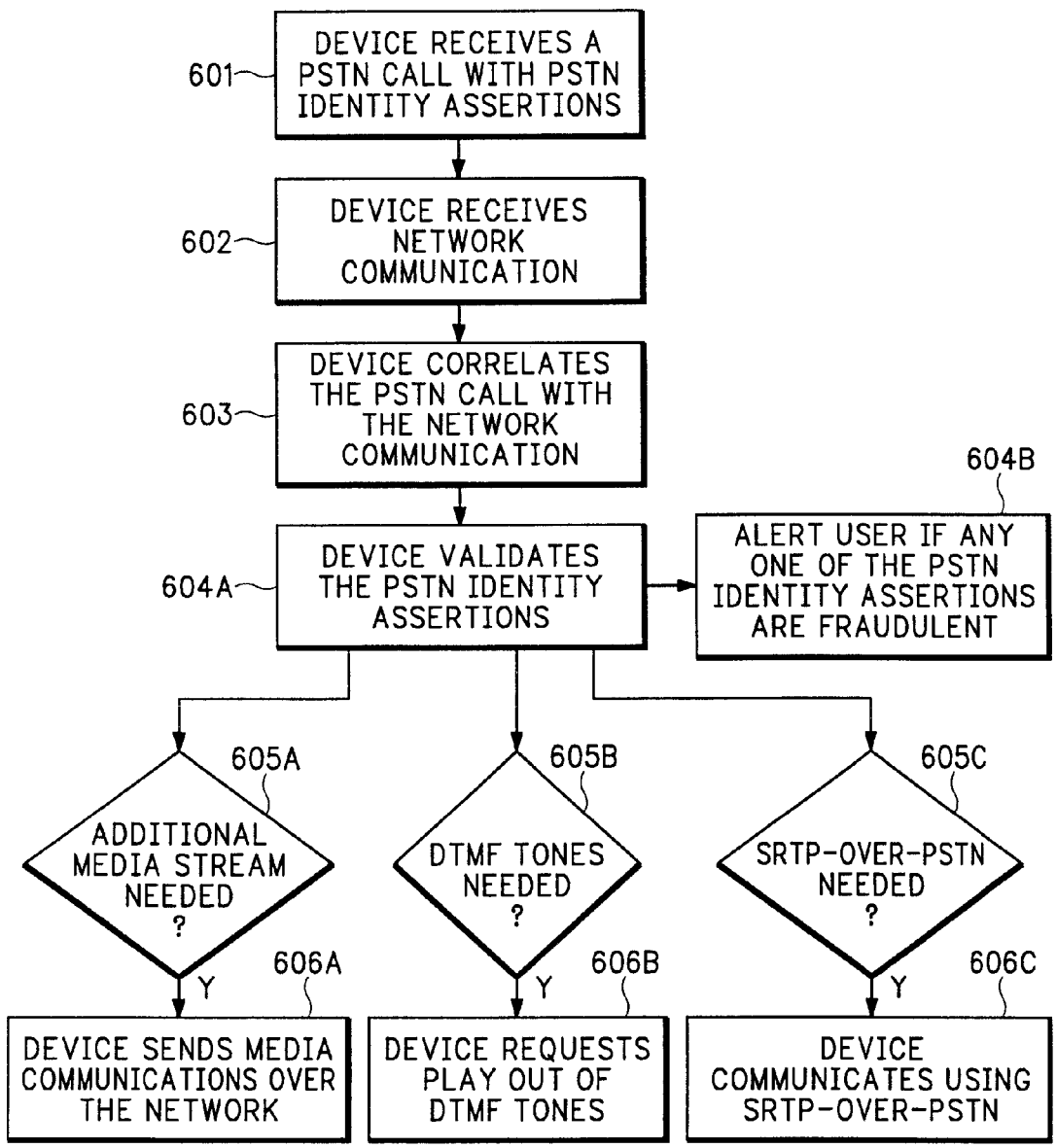
FIG. 6 is a flowchart showing how the device authenticates a PSTN identity assertion.

Referring to FIG. 6, the device 400 in block 601 receives a call over the PSTN and receives authentication over the network. The device 400 in block 601 receives a PSTN call including PSTN identity assertions. The device 400 receives a network communication in block 602. In block 603 the device 400 then correlates the network communication with the received PSTN call. After correlating, in block 604A the device 400 validates the PSTN identity assertion based on a network identity assertion included in the network communication. Optionally in block 604B a user is alerted if any one of the PSTN identity assertions are fraudulent.

Optionally in block 605A, device 400 determines whether additional media exchange is needed. If additional media exchange is needed, in block 606A device 400 exchanges additional media over the network. Optionally in block 605B, device 400 determines whether DTMF tones are needed to further specify the PSTN identity assertion. If DTMF tones are needed, in block 606B device 400 requests play out of DTMF tones. Optionally in block 605C, device 400 determines whether SRTP-over-PSTN communications are needed. If SRTP-over PSTN communications are needed, in block 606C device 400 communicates over the PSTN using SRTP-over-PSTN.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred example thereof, it should be apparent that the invention may be modified in arrangement and detail 20 without departing from such principles. I claim all modifications and variation coming within the spirit and scope of the following claims.

What is claimed is:

1. An apparatus encoded with instructions that, if executed, result in:

receiving a first communication over a first call path that traverses a Publicly Switched Telephone Network (PSTN) and that originates from an endpoint, the first communication including a PSTN identity assertion generated by a device operating in the PSTN;

receiving a second communication over a second different call path originating from the same endpoint, wherein the second different call path extends over a packet switched network and includes a packet switched identity assertion inserted in a session initiation protocol message header by a packet switched network device, wherein the packet switched identity assertion is a session initiation protocol identity; and authenticating the PSTN identity assertion using the packet switched identity assertion, wherein the apparatus determines if the PSTN identity assertion is false based on information from the packet switched identity assertion.

2. The apparatus of claim 1, wherein the instructions, if executed, result in:

sending the PSTN identity assertion from the first communication to a database that correlates phone numbers with other identities;

receiving back a response from the database and extracting an identity there from; and comparing the extracted identity to the packet switched identity assertion from the second communication;

wherein the PSTN identity assertion is authenticated according to a result of the comparison.

3. The apparatus of claim 2, wherein the PSTN identity assertion is authenticated according to whether the comparison indicates a match.

4. The apparatus of claim 2, wherein the instructions, if executed result in:

alerting a user of a false PSTN identity assertion in the PSTN identity assertion if the extracted identity does not match the packet switched identity assertion.

5. The apparatus of claim 1, wherein the PSTN identity assertion is from a caller ID field, and wherein data taken from the caller ID field is authenticated using the packet switched identity assertion.

6. An apparatus encoded with instructions that, if executed, result in:

receiving a first communication over a first call path that traverses a Publicly Switched Telephone Network (PSTN) and that originates from an endpoint, the first communication including a PSTN identity assertion generated by a device operating in the PSTN;

receiving a second communication over a second different call path originating from the same endpoint, wherein the second different call path extends over a packet switched network and includes a packet switched identity assertion inserted into a session initiation protocol (SIP) message header by a packet switched network device, wherein the packet switched identity assertion is a SIP identity;

authenticating the PSTN identity assertion using the packet switched identity assertion;

sending the PSTN identity assertion from the first communication to a database that correlates phone numbers with other identities;

receiving back a response from the database and extracting an identity there from;

comparing the extracted identity to the packet switched identity assertion from the second communication; and initiating a Secure Real Time Protocol (SRTP)-over-PSTN communication exchange with a device associated with the packet switched identity assertion of the PSTN identity assertion is authenticated.

7. A method, comprising:

receiving an indication that a local device has established a call originating from the local device having a first path that traverses the Publicly Switched Telephone Network (PSTN);

in response to receiving the indication that the local device has established the call, generating a communication using a packet switched signaling protocol and sending the communication to a called endpoint of the call over a second different path that extends over at least one packet switched network for use by the called endpoint, wherein the second different path circumvents the PSTN;

wherein the communication contains information for correlating a packet switched identity assertion included in a session initiation protocol (SIP) message header of the packet switched communication with a PSTN identity assertion included in the PSTN call, wherein the packet switched identity assertion is a SIP identity; and authenticating the PSTN identity assertion using the packet switched identity assertion, wherein an apparatus determines if the PSTN identity assertion is false based on information from the packet switched identity assertion.

8. The method of claim 7, further comprising:

identifying a telephone number for the called endpoint and sending the identified telephone number to a remote database that associates telephone numbers with network addresses; and addressing the communication using a network address identified by the database.

9. The method of claim 7, further comprising:

inserting the PSTN identity assertion from the call into a payload of the communication; and inserting the packet switched identity assertion in a header of the communication.

* * * * *